(12) United States Patent
Forin

(10) Patent No.: US 6,760,787 B2
(45) Date of Patent: Jul. 6, 2004

(54) RECOVERABLE METHODS AND SYSTEMS FOR PROCESSING INPUT/OUTPUT REQUESTS INCLUDING VIRTUAL MEMORY ADDRESSES

(75) Inventor: Alessandro Forin, Redmond, WA (US)

(73) Assignee: Miscrosoft Corporation, Redmond, WA (US)

( * ) Notice: Subject to any disclaimer, the term of this patent is extended or adjusted under 35 U.S.C. 154(b) by 402 days.

(21) Appl. No.: 09/907,222

(22) Filed: Jul. 17, 2001

(65) Prior Publication Data

US 2001/0047438 A1 Nov. 29, 2001

Related U.S. Application Data

(62) Division of application No. 09/222,696, filed on Dec. 26, 1998, now Pat. No. 6,321,276.
(60) Provisional application No. 60/095,297, filed on Aug. 4, 1998.

(51) Int. Cl.$^7$ ............................................... G06F 13/14
(52) U.S. Cl. ...................... 710/18; 711/202; 711/203; 711/205; 711/207; 709/236; 707/202
(58) Field of Search ........................... 710/18; 709/236; 707/202; 711/202, 203, 205, 207

(56) References Cited

U.S. PATENT DOCUMENTS

| | | | |
|---|---|---|---|
| 4,654,790 A | * | 3/1987 | Woffinden .................. 364/200 |
| 5,187,790 A | | 2/1993 | East et al. |
| 5,239,635 A | | 8/1993 | Stewart et al. |
| 5,278,961 A | | 1/1994 | Mueller |
| 5,307,487 A | | 4/1994 | Tavares et al. |
| 5,432,784 A | | 7/1995 | Oezveren |
| 5,446,854 A | | 8/1995 | Khalidi et al. |
| 5,479,627 A | | 12/1995 | Khalidi et al. |
| 5,617,348 A | | 4/1997 | Maguire |
| 5,623,636 A | | 4/1997 | Revilla et al. |
| 5,682,553 A | | 10/1997 | Osborne |
| 5,701,432 A | | 12/1997 | Wong et al. |
| 5,732,405 A | | 3/1998 | Ho et al. |
| 5,799,195 A | | 8/1998 | Ross |
| 5,826,057 A | | 10/1998 | Okamoto et al. |
| 5,864,876 A | | 1/1999 | Rossum et al. |
| 5,899,994 A | | 5/1999 | Mohamed et al. |
| 5,905,509 A | | 5/1999 | Jones et al. |
| 5,914,730 A | | 6/1999 | Santos et al. |
| 5,918,229 A | | 6/1999 | Davis et al. |
| 5,924,098 A | | 7/1999 | Kluge |
| 5,946,711 A | | 8/1999 | Donnelly |

(List continued on next page.)

FOREIGN PATENT DOCUMENTS

| | | |
|---|---|---|
| EP | 674414 | 9/1995 |
| EP | 902355 | 1/2000 |
| GB | 1 595 740 | 8/1981 |
| JP | 11-167525 A2 | 6/1999 |
| WO | WO 98/30969 A2 | 7/1998 |
| WO | WO 98/30969 | 7/1998 |

OTHER PUBLICATIONS

Larson et al., "LKRHash: Scalable Hash Tables", pp. 1–15, Draft Nov. 19, 1998.

(List continued on next page.)

Primary Examiner—A. Elamin
(74) Attorney, Agent, or Firm—Leydig, Voit & Mayer LTD

(57) ABSTRACT

A recoverable I/O request processor includes computer-executable instructions for processing I/O requests, such as requests to send or receive data through a network. The recoverable I/O request processor translates virtual memory addresses to physical memory addresses utilizing translation tables local to an I/O device. If a local translation fails, the recoverable I/O request processor requests virtual address mapping information from the operating system.

10 Claims, 11 Drawing Sheets

U.S. PATENT DOCUMENTS

| | | | |
|---|---|---|---|
| 5,953,530 A | | 9/1999 | Rishi et al. |
| 5,956,756 A | | 9/1999 | Khalidi et al. |
| 5,968,128 A | | 10/1999 | Lauck et al. |
| 5,983,332 A | | 11/1999 | Watkins |
| 5,991,797 A | | 11/1999 | Futral et al. |
| 6,009,269 A | | 12/1999 | Burrows et al. |
| 6,018,746 A | * | 1/2000 | Hill et al. .................... 707/202 |
| 6,029,224 A | | 2/2000 | Asthana et al. |
| 6,047,283 A | | 4/2000 | Braun |
| 6,067,604 A | | 5/2000 | Ramachandran et al. |
| 6,078,994 A | | 6/2000 | Carey |
| 6,088,044 A | | 7/2000 | Kwok et al. |
| 6,092,116 A | * | 7/2000 | Earnest et al. .............. 709/236 |
| 6,092,170 A | | 7/2000 | Kori |
| 6,115,802 A | | 9/2000 | Tock et al. |
| 6,118,724 A | | 9/2000 | Higginbottom |
| 6,157,955 A | | 12/2000 | Narad et al. |
| 6,167,402 A | | 12/2000 | Yeager |
| 6,226,267 B1 | | 5/2001 | Spinney et al. |
| 6,249,819 B1 | | 6/2001 | Hunt et al. |

OTHER PUBLICATIONS

Ryan et al., "SCI for Local Area Networks," Research Report 256, University of Oslo, Norway, pp. 1–18, Jan. 1998.

Ian Alexander Prat, "The User–Safe Device I/O Architecture," Dissertation, King's College, University of Cambridge, pp. 1–158, Aug. 1997.

Welsh et al., "Incorporating Memory Management into User–Level Network Interfaces," Department of Computer Science, Cornell University, 1997.

Chen et al., "UTLB: A Mechanism for Address Translation on Network Interfaces," published in "Proceedings of the Eighth International Conference on Architectural Support for Programming Languages and Operating Systems" (APLOS VIII), vol. 33, No. 11, pp. 193–204, Nov. 1998.

"Windows* Sockets 2 Service Provider Interface," Revision 2.0.8, pp. 1–157, Jun. 30, 1995.

Li et al., "High–Performance Distributed Objects Over a System Area Network," pp. 1–14, Dec. 14, 1998.

"Virtual Interface Architecture Specification," Draft Revision 1.0, pp. 1–83, Dec. 4, 1997.

Goodman et al., "Memory Systems," *The Electrical Engineering Handbook*, CRC Press, pp. 1927–1936, 1993.

Nelson, Mark, *The Data Compression Book*, Chapter 11 "Lossy Graphics Compression", M&T Books, 1992, pp. 347–374.

Pennebaker, William B. and Mitchell, Joan, *JPEG Still Image Data Compression Standard*, Chapter 5 "Image Compression Systems", Chapter 6 "JPEG Modes of Operation", and Chapter 7 "JPEG Syntax and Data Organization", Van Nostrand Reinhold, 1993, pp. 65–134.

Welsh, M. et al., "Memory Management for User–Level Network Interfaces", *IEEE Micro*, vol. 18, No. 2, pp. 77–82, Mar. 1, 1998.

Blumrich, M.A., et al, "Virtual Memory Mapped Network Interface for the SHRIMP Multicomputer", *Computer Architecture News*, vol. 22, No. 2, pp. 142–153, Apr. 1, 1994.

Structured Computer Organization, pp. 308–341, Andrew S. Tanenbaum, © 1984 by Prentice–Hall, Inc., Englewood Cliffs, N. J. 07632.

Katevenis, Buffer Requirements of Credit–Based Flow Control When a Minimum Draining Rate Is Guaranteed, IEEE 1997.

Kung et al., Client–Server Performance on Flow–Controlled ATM Network: A Web Database of Simulation Results, IEEE 1997.

Katevenis et al., Credit–Flow–Controlled ATM for MP Interconnection: The ATLAS I Single Chip ATM Switch, IEEE Feb. 1998.

Kant, Flow Control Mechanisms for SAAL Links, IEEE 1996.

* cited by examiner

RECOVERABLE METHODS AND SYSTEMS FOR PROCESSING INPUT/OUTPUT REQUESTS INCLUDING VIRTUAL MEMORY ADDRESSES

CROSS-REFERENCE TO RELATED APPLICATION

The present application is a divisional of U.S. patent application Ser. No. 09/222,696, filed on Dec. 26, 1998 now U.S. Pat. No. 6,321,276, and also claims the benefit of United State Provisional Patent Application Serial No. 60/095,297, filed on Aug. 4, 1998, the disclosure of which is incorporated herein by reference in its entirety.

TECHNICAL FIELD

This invention relates generally to methods and systems for processing input/output (I/O) requests in a computer operating system. More particularly, the present invention relates to recoverable methods and systems for processing I/O requests that specify virtual memory addresses to I/O devices.

BACKGROUND OF THE INVENTION

One goal of a computer operating system is to provide safe and efficient access to I/O devices, such as network communication adapters, permanent storage devices, audio devices, and video devices. The I/O performance of an operating system is affected by the need to translate virtual memory addresses utilized by application programs to physical memory addresses used by hardware devices. For example, in order to access I/O devices, application programs issue I/O requests to the operating system specifying the virtual memory address of data to be written to an I/O device or the virtual memory address where data received from an I/O device is to be stored. A memory manager unit (MMU), which is a hardware component of the host computer, translates virtual memory addresses to physical memory addresses. However, I/O devices are incapable of utilizing the host computer's MMU to translate virtual memory addresses in I/O requests to physical memory addresses. As a result, conventional I/O devices are presented by the operating system with the physical memory addresses of data processed in I/O operations. In addition, in order to prevent the data to be processed in an I/O operation from being moved to a disk, the operating system locks the virtual memory pages containing the data in main memory for the duration of the I/O operation. The operating system unlocks the virtual pages from main memory when the I/O operation completes. Translating virtual memory addresses to physical memory addresses, locking virtual pages in main memory, and unlocking pages in response to each I/O operation is processor-intensive and increases latency in I/O operations.

In order to increase the efficiency of I/O operations, some I/O devices perform virtual to physical address translations by storing tables mapping virtual memory addresses to physical memory addresses in memory local to the I/O devices. However, these I/O devices are unable to recover if local address translation fails. As a result, the I/O devices require registration and locking of memory regions used in I/O operations prior to performing an I/O operation. Memory registration is initiated by application-level code. The result of memory registration is a memory handle that the application communicates to the I/O device when requesting an I/O operation. The I/O device uses the handle to verify and translate the virtual memory address to a physical memory address. When an application completes use of a memory region, the application deregisters the memory region with the I/O device. Although using memory handles allows applications to specify virtual memory addresses rather than physical addresses to I/O devices, registering and deregistering memory regions adds complexity to application programs.

Another problem with conventional I/O devices that require locking of I/O buffers in main memory is that locking may result in inefficient usage of main memory. For example, locking prevents main memory from being used by other applications, even when the locking application is not using the pages stored in main memory. In addition, most operating systems limit the amount of main memory that can be locked by an application to a small percentage, e.g., about sixteen percent, of main memory. The limit on the amount of main memory that can be locked may adversely affect the I/O performance of applications that require locking.

In light of these difficulties, there exists a need for recoverable methods and systems for processing I/O requests that allows applications to specify virtual memory addresses to I/O devices and that reduce the need for preregistration of memory regions or locking of memory regions in main memory.

SUMMARY OF THE INVENTION

The present invention alleviates at least some of these difficulties by providing a recoverable I/O request processor for an I/O device capable of automatically translating virtual memory addresses to physical memory addresses, and, if a translation fails, obtaining virtual memory mapping information from the operating system. For example, when an I/O operation, such as a "Winsock" send( ) operation, is executed by an application, the virtual memory address of the buffer to be sent using the I/O operation may be communicated directly to the recoverable I/O request processor of the I/O device. The recoverable I/O request processor may attempt to translate the virtual memory address to a physical memory address. If the translation is unsuccessful, the recoverable I/O request processor may request the virtual memory mapping information from the operating system. The operating system may communicate the mapping information to the I/O device. The recoverable I/O request processor may perform the translation and continue processing the I/O operation. Thus, I/O devices according to the present invention may be capable of recovering from address translation failures.

According to another aspect, the present invention includes methods and systems for maintaining coherence between virtual memory mapping information maintained by the recoverable I/O request processor of an I/O device and virtual memory mapping information maintained by the operating system. For example, when a virtual memory page is paged out to a disk, the virtual memory manager or equivalent operating system component preferably notifies the recoverable I/O request processor of an I/O device of the page out before performing the page out. The notification can be performed using a callback function previously registered by an I/O device driver with the virtual memory manager. The callback function may be associated with a particular process or address space. If the virtual memory manager executes a page out that affects an address space having an associated callback function, the callback function may specify that the virtual memory manager inform the I/O device driver of the page out operation. The I/O device driver may inform the recoverable I/O request processor so that the recoverable I/O request processor can update its page tables. In this manner, the virtual address mappings maintained by the recoverable I/O request processor of the I/O device and those maintained by the virtual memory manager may be consistent. Additional operating system interactions that may be used to maintain virtual address mapping coherence include notifying the recoverable I/O request processor of changes in protection attributes associated with virtual memory and allowing the recoverable I/O request processor to request a page in operation to move paged-out virtual memory contents back to main memory.

According to another aspect, the present invention may include a recoverable input/output (I/O) request processor including computer instructions embodied in a computer-readable medium and executable by an I/O device for performing steps. The steps may include receiving requests for performing an I/O operation for writing data to or reading data from a virtual memory address. The recoverable I/O request processor may search for a physical memory address corresponding to the virtual memory address in address translation tables local to the I/O device. If the recoverable I/O request processor fails to locate the physical memory address, the recoverable I/O request processor may request virtual to physical memory mapping information from the host operating system. The recoverable I/O request processor may receive virtual to physical memory mapping operation from the operating system, and, in response, translate the virtual memory address to a physical memory address. After translating the virtual memory address, the recoverable I/O request processor may perform the requested I/O operation.

According to another aspect, the present invention may include a method for maintaining coherence between virtual memory mapping information of a virtual memory manager and virtual memory mapping information of an I/O device. The method may include steps performed by an I/O device driver and a virtual memory manager. The steps performed by the I/O device driver may include registering a callback routine associated with a virtual memory address with a virtual memory manager. The virtual memory manager may receive requests to alter or move the contents of a virtual memory address. In response to the requests, the virtual memory manager may execute the callback routine to notify an I/O device driver of the request.

According to another aspect, the present invention may include a descriptor for communicating an I/O request to an I/O device. The descriptor may include a control field for storing a code indicative of an I/O operation. The descriptor may also include a buffer virtual address field for storing a virtual memory address of a buffer to be utilized in an I/O operation. Further, the descriptor may include a translation error control flag field for storing a translation error control flag for instructing a recoverable I/O request processor of an I/O device to attempt to recover from a virtual address translation failure.

According to another aspect, the present invention may include a method for processing an I/O request. The method may include receiving, at an I/O device, a virtual memory address to be translated to a physical memory address. Next, the I/O device may attempt to translate the virtual memory address to a physical memory address using translation tables local to the I/O device. In response to failing to translate the virtual memory address, the I/O device may generate an interrupt to a host processor and halt processing of the I/O operation. The I/O device may then receive virtual address mapping information from an I/O device driver in response to the interrupt. After receiving the mapping information, the I/O device may restart processing of the I/O operation in response to a request from an application program.

According to a further aspect, the present invention may include a translation error recovery routine for registering memory and restarting processing of an I/O operation when an I/O device fails to translate a virtual memory address to a physical memory address. The translation error recovery routine may include steps or instructions executable by a computer. The steps may include receiving notification that an I/O device is incapable of translating a virtual memory address of data used in an I/O request to a physical memory address. In response to the notification, the translation error recovery routine may request registration of the virtual memory address from a device driver for the I/O device. If the registration is successful, the translation error recovery routine may communicate the virtual memory address to the I/O device for translation.

According to another aspect, the invention may include a system for processing input/output requests for sending and receiving data over a network. The system may include an I/O request queue for receiving descriptors specifying I/O requests from application programs. The system may also include a recoverable I/O request processor for processing the descriptors, including translating the virtual memory addresses of the descriptors to physical memory addresses, suspending processing of the descriptors in the I/O request queue when an address translation failure occurs, and resuming processing of the descriptors when the address translation failure is corrected.

According to yet another aspect, the invention may include a network interface adapter card. The network interface adapter card may include a processing unit and a memory unit coupled to the processing unit. The memory unit may include computer-executable instructions for performing steps. The steps may include translating virtual memory addresses to physical memory addresses. The steps may also include transmitting data from a virtual memory address to a remote machine. When an address translation failure occurs, the steps may include requesting virtual memory mapping information from an operating system.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
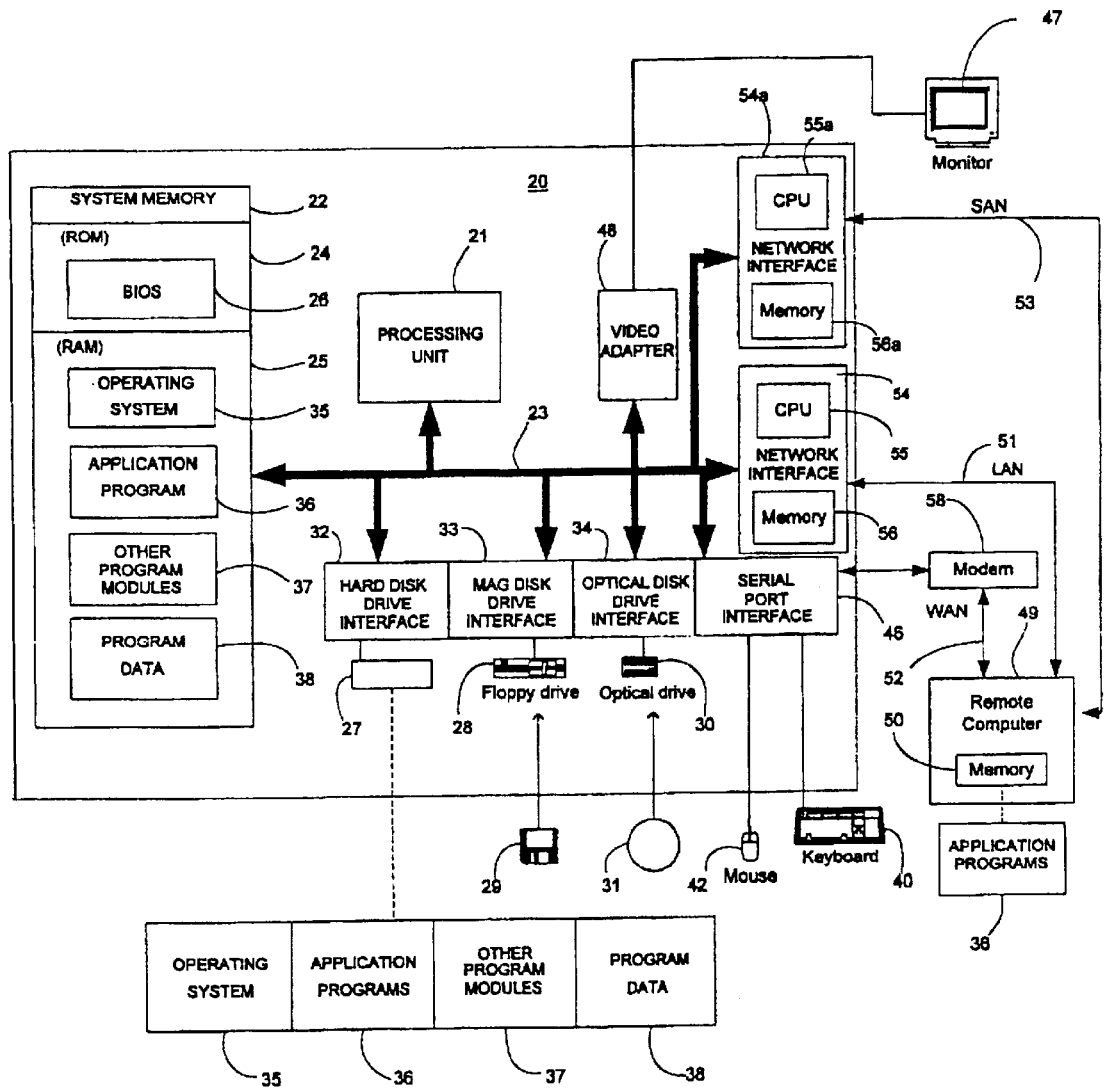
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the personal computer 20. Although the exemplary environment described herein employs a hard disk, a removable magnetic disk 29, and a removable optical disk 31, it will be appreciated by those skilled in the art that other types of computer-readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. The operating system 35 may include a virtual memory manager and one or more I/O device drivers that communicate with each other to maintain coherence between virtual memory address mapping information stored by the operating system 35 and virtual memory mapping information stored by one or more I/O devices, such as a network interface adapter 54. A user may enter commands and information into the personal computer 20 through input devices such as a keyboard 40 and a pointing device 42. Other input devices (not shown) may include a microphone, touch panel, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet. System area networking environments are used to interconnect nodes within a distributed computing system, such as a cluster. For example, in the illustrated embodiment, the personal computer 20 may comprise a first node in a cluster and the remote computer 49 may comprise a second node in the cluster. In such an environment, it is preferable that the personal computer 20 and the remote computer 49 be under a common administrative domain. Thus, although the computer 49 is labeled "remote", the computer 49 may be in close physical proximity to the personal computer 20.

When used in a LAN or SAN networking environment, the personal computer 20 is connected to the local network 51 or system network 53 through network interface adapters 54 and 54*a*. The network interface adapters 54 and 54*a* may include processing units 55 and 55*a* and one or more memory units 56 and 56*a*. The memory units 56 and 56*a* may contain computer-executable instructions implementing some aspects of the invention. For example, the memory units 56 and 56*a* may include computer-executable instructions for processing I/O requests including translating virtual memory addresses to physical memory addresses, obtaining virtual address mapping information from the operating system 35, and recovering from local address translation failures. The memory units 56 and 56*a* may also contain page tables used to perform local virtual to physical address translations.

When used in a WAN networking environment, the personal computer 20 typically includes a modem 58 or other means for establishing communications over the WAN 52. The modem 58, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

Although the recoverable I/O request processing methods and systems are described with reference to network interface adapters, such as network interface adapters 54 and 54*a*, the present invention is not limited to such an embodiment. For example, the recoverable I/O request processing methods and systems described herein may be used to improve the I/O performance of any I/O device. For example, the hard disk interface 32, the magnetic disk drive interface 33, the optical disk drive interface 34, and the serial port interface 46 and/or the video adapter 48 may include a recoverable I/O request processor according to any of the embodiments of the present invention.

Figure 2:
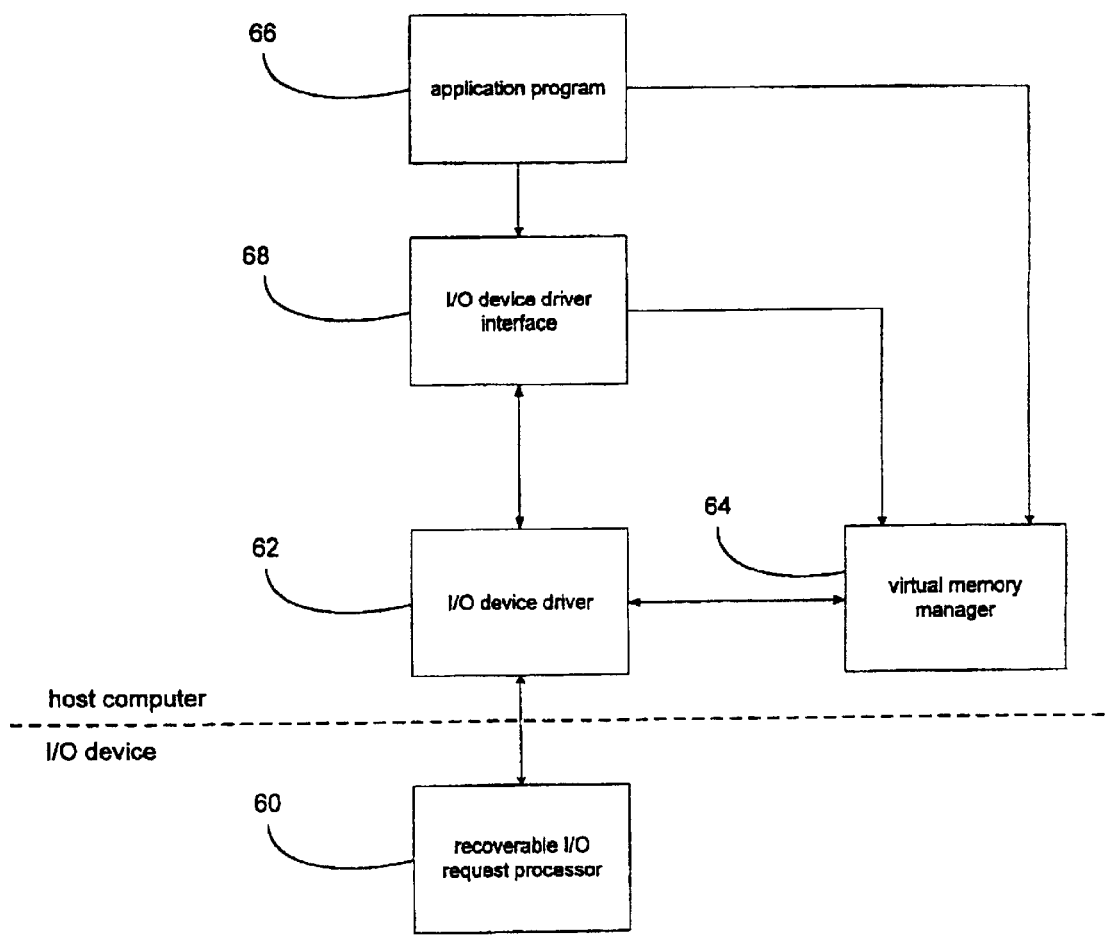
FIG. 2 is a block diagram illustrating a recoverable I/O request processing system according to an embodiment of the present invention.

Referring to FIG. 2, according to a first aspect, the present invention may include a recoverable I/O request processor 60 executable by an I/O device for processing I/O requests. For example, the recoverable I/O request processor 60 may translate virtual memory addresses specified by I/O requests from application programs to physical memory addresses by accessing page tables local to an I/O device. As used herein, the term "local", when used to describe the page tables or virtual memory mapping information of an I/O device, is intended to indicate that the tables or mapping information is stored in physical memory of an I/O device, i.e., in a memory chip or other storage medium addressable by the processing unit of an I/O device. The tables could also be stored in host memory, and be accessible by and under control of the I/O device. In an alternative but less desirable implementation, the I/O device could be instructed to access the host page tables 74 directly. The phrase "local address translation," as used herein, is intended to indicate an address translation performed by the processing unit of an I/O device under the control of the recoverable I/O request processor 60.

According to an important aspect of the invention, the recoverable I/O request processor 60 is preferably capable of recovering from local virtual memory address translation failures. For example, if the recoverable I/O request processor 60 is unable to translate a virtual memory address because address translation tables local to the I/O device do not contain a valid entry for the virtual memory address of interest, the recoverable I/O request processor is preferably capable of obtaining the virtual memory mapping information from an external source, e.g., from the virtual memory manager 64, without failing the I/O operation. The recoverable I/O request processor 60 may include additional I/O request processing routines according to the type of I/O device being accessed. For example, if the I/O device comprises a network interface adapter, the recoverable I/O request processor 60 may include computer-executable instructions for sending and receiving data through a network. In an alternative embodiment, if the I/O device comprises a graphics card for controlling display of computer graphics, the recoverable I/O request processor 60 may include computer-executable instructions for manipulating graphical objects. In another alternative, if the I/O device comprises a disk controller card, the recoverable I/O request processor 60 may include computer-executable instructions for controlling permanent storage devices, such as disks and tapes, and for mapping the I/O operations to direct commands or to other storage communication protocols, such as SCSI and FiberChannel.

The present invention is not limited to graphics cards or network interface adapters. The recoverable I/O request processor may be used with any type of I/O device. For example, in an alternative embodiment, the recoverable I/O request processor may include instructions for processing I/O requests for a video device, an audio device, or a storage device, such as a disk or tape device.

According to another aspect, the present invention may include an I/O device driver 62. The I/O device driver 62 may comprise computer instructions executable by a host computer for communication with the recoverable I/O request processor 60. For example, when the recoverable I/O request processor 60 is incapable of translating a virtual memory address to a physical memory address, the I/O device driver 62 may receive requests for translating virtual memory addresses to physical memory addresses from the I/O request processor 60, forward the requests to the virtual memory manager 64, receive responses from the virtual memory manager 64, and forward the responses to the recoverable I/O request processor 60. The I/O device driver 62 may also assist in maintaining coherence between virtual memory mapping information maintained by the recoverable I/O request processor 60 and virtual memory mapping information maintained by the virtual memory manager 64. For example, the I/O device driver 62 may request notification, e.g., using callback routines, from the virtual memory manager 64 when the virtual memory manager 64 moves virtual memory pages to or from a disk or when memory protection attributes change, including invalidations required for workset trimming and/or for collecting Least Recently Used (LRU) information. The I/O device driver 62 may also inform the recoverable I/O request processor 60 of these changes. The interactions between the I/O device driver 62 and the virtual memory manager 64 for maintaining coherence between the memory mapping information of the virtual memory manager and the memory mapping information of the recoverable I/O request processor 60 are discussed in more detail below.

The virtual memory manager 64 may include any set of computer instructions executable by the host computer for performing virtual memory management functions, including transferring virtual pages between main memory and disk storage, maintaining page tables used by the host MMU for translating virtual memory addresses to physical memory addresses, and providing virtal memory mapping information to other operating system components. According to an important aspect of the invention, the virtual memory manager 64 preferably informs the I/O device driver 62 when virtual memory pages are transferred to a disk and when memory protection attributes change. For example, the I/O device driver 62 may register callback routines with the virtual memory manager 64 relating to virtual memory pages. The virtual memory manager 64 may execute the callback routines when the virtual memory manager 64 affects a virtual memory page for which a callback routine was registered. In an alternative arrangement, asynchronous event notification may be used to notify the I/O device driver when the virtual memory manager 64 moves virtual memory pages or changes protection attributes of a page.

The application program 66 may comprise any computer instructions executable by the host computer for requesting I/O operations from an I/O device. For example, if the I/O device comprises a network interface adapter card, the application program 66 may comprise a web browser capable of sending data to and receiving data from remote hosts connected to the local host computer over a network. Existing application programs communicate with I/O devices by specifying virtual memory addresses and may not include code for registering and deregistering virtual memory regions with I/O devices. However, because the recoverable I/O request processor 60 is capable of performing virtual to physical address translations, and recovering from local translation errors, the application 66 may not be required to register and deregister I/O buffers used in I/O operations with the I/O device. Thus, one advantage of the present embodiment may be compatibility with existing application programs.

The I/O device driver interface 68 may comprise computer instructions executable by the host computer for converting commands from the application program 66 to commands recognizable by the I/O device driver 62. The structure of the device driver interface 68 depends on the type of I/O device with which communication is desired. For example, if the I/O device comprises a network interface adapter, the I/O device driver interface 68 may convert user application level commands for sending and receiving data into data structures including bit codes indicative of the commands and virtual addresses for sending and receiving the data. The I/O device driver interface 68 may also communicate with the virtual memory manager 64 to register and deregister memory regions used by the application program 66. However, as will be discussed in more detail below, memory registration prior to performing I/O operations may be rendered unnecessary by preferred implementations of the invention because virtual addresses are translated automatically in response to each I/O request.

Figure 3:
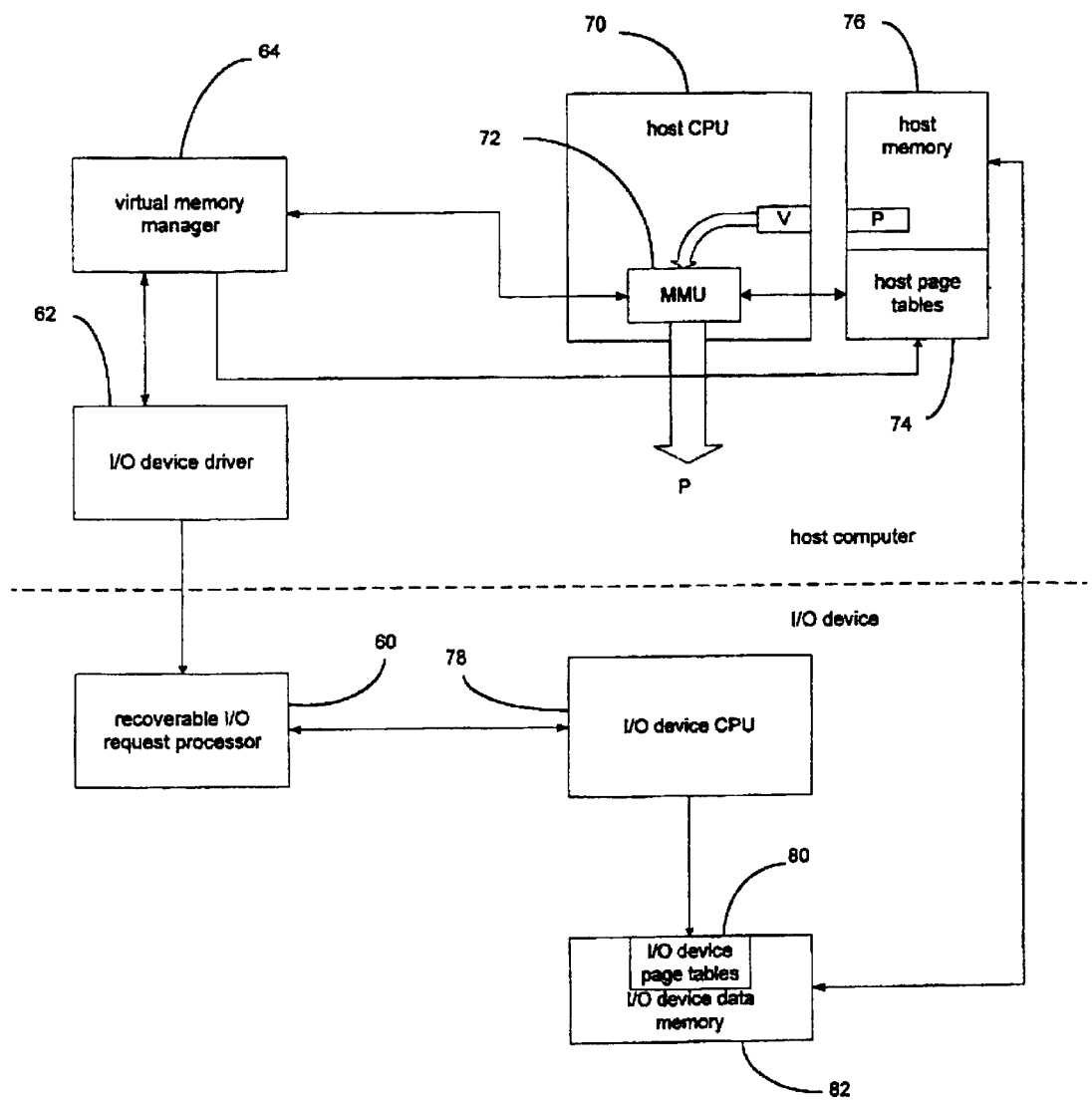
FIG. 3 is a block diagram illustrating a virtual memory mapping system of a host computer and an I/O device including a recoverable I/O request processor according to an embodiment of the invention.

FIG. 3 illustrates an exemplary virtual memory mapping system for a host computer and a recoverable I/O request processing system for an I/O device connectable to the host computer according to an embodiment of the invention. In FIG. 3, the host computer includes a central processing unit (CPU) 70 for controlling operations of the host computer. The CPU 70 of the host computer may include an MMU 72 for translating virtual memory addresses to physical memory addresses. The host CPU 70 may also include one or more registers for receiving virtual memory addresses. In order to translate virtual memory addresses to physical memory addresses, the MMU 72 may access host page tables 74 stored in host memory 76. For example, when a virtual memory address V is written to a register, the MMU locates the page table entry in the host page tables 74 and determines the physical memory address P in the host memory 76 from the page table entry. The virtual memory manager 64 initializes and maintains the host page tables 74.

The I/O device may also include a CPU 78 for controlling operations of the I/O device. However, unlike the host CPU 70, the CPU 78 of the I/O device may or may not include an MMU for translating virtual memory addresses to physical memory addresses. If the CPU 78 of the I/O does not include an MMU, the recoverable I/O request processor 60 may include computer instructions executable by the I/O device CPU 78 for translating virtual memory addresses to physical memory addresses. For example, the recoverable I/O request processor 60 may control the I/O device CPU 78 to access page tables 80 stored in the I/O device data memory 82 to translate virtual memory addresses to physical memory addresses. The recoverable I/O request processor 60 may also control the I/O device CPU 78 to maintain virtual address translation information in the I/O device page tables 80 in response to virtual address mapping information received from the host computer. In an alternative embodiment, the I/O device CPU 78 may include an MMU and operate similarly or identically to the CPU 70 of the host computer. In such an embodiment, the recoverable I/O request processor may include instructions for recovering when an address translation failure occurs.

Figure 4:
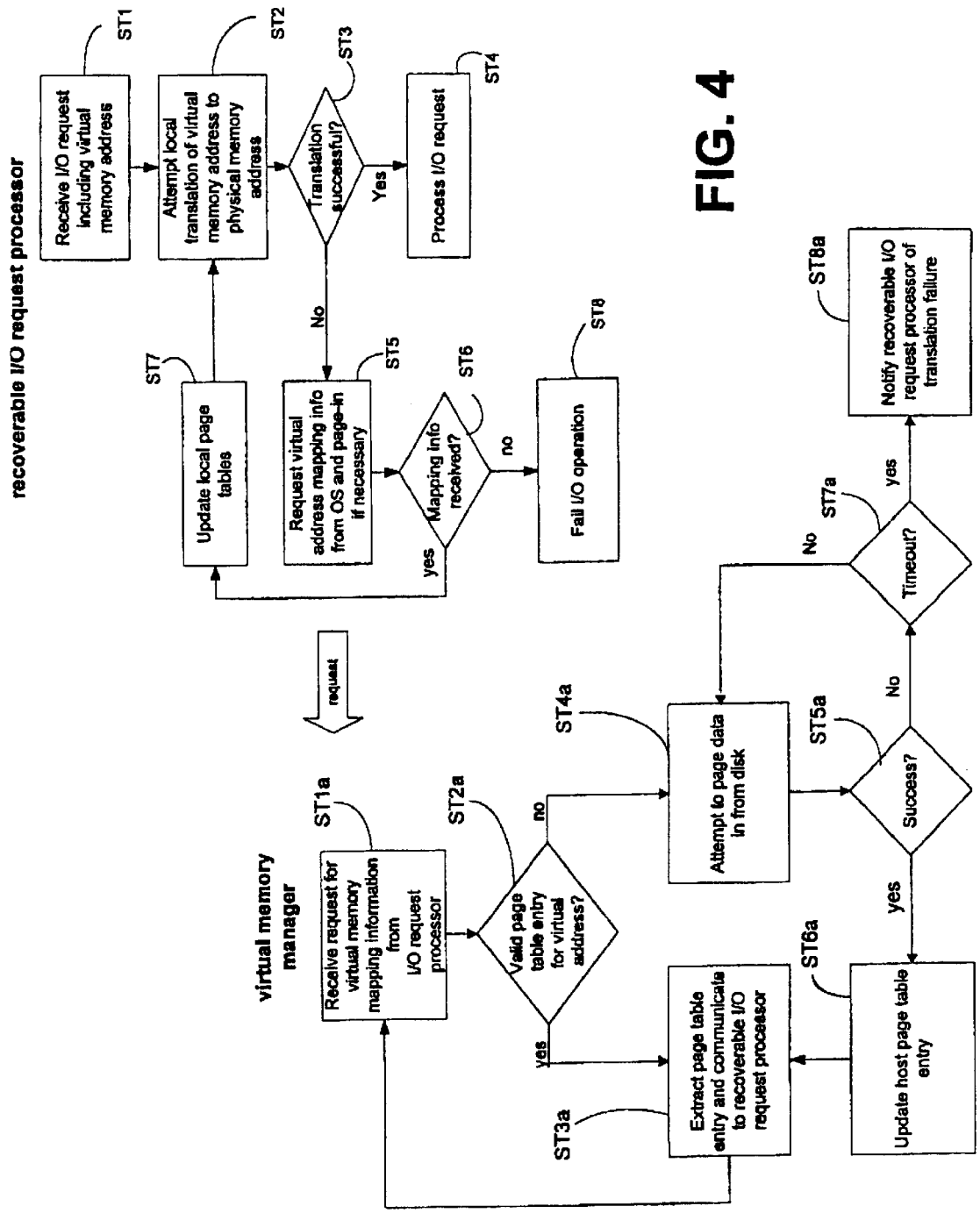
FIG. 4 is a flow diagram illustrating exemplary steps that may be performed by a recoverable I/O request processor and a virtual memory manager for processing I/O requests including virtual memory addresses according to an embodiment of the present invention.

FIG. 4 illustrates exemplary steps that may be performed by the recoverable I/O request processor 60 and the virtual memory manager 64 in processing an I/O request received from a user application program. In step ST1, the recoverable I/O request processor 60 may receive an I/O request including a virtual memory address. The request may be communicated to the recoverable I/O request processor 60 in any number of ways. For example, when an application requests an I/O operation, the operating system communication provider software may convert the request into a descriptor containing a pointer to the data buffer used in the I/O operation. The provider software may post the descriptor in a work queue associated with the I/O device. When the descriptor is posted, the provider software may activate a doorbell associated with the I/O device to notify the I/O device of new descriptors in the work queue. Activating the doorbell may include writing a doorbell token containing a pointer to the descriptor to a doorbell register associated with the work queue. The recoverable I/O request processor 60 preferably processes descriptors in the work queue in the order in which the descriptors are posted. In an alternative arrangement, the I/O requests may be communicated to the recoverable I/O request processor using direct communication methods similar to those described in copending U.S. patent application Ser. No. 08/695,163, filed Aug. 7, 1996 and entitled, "Method and System for Accessing and Displaying a Compressed Display Image in a Computer System," the disclosure of which is incorporated by reference herein in its entirety.

Once the recoverable I/O request processor 60 receives an request, the recoverable I/O/O request processor 60 may attempt to locally translate the virtual memory address to a physical memory address by accessing the I/O device page tables 80 stored in I/O device data memory 82. (step ST2) Alternatively, the recoverable I/O request processor may have a fast link with host memory. In such an arrangement, the page tables may be stored in host memory, and the I/O device may access these page table to perform the translation. After the page tables are accessed, the recoverable I/O request processor 60 determines whether the translation is successful. (step ST3) If the translation is successful, the recoverable I/O request processor may process the I/O request. (step ST4) If the translation is unsuccessful, the recoverable I/O request processor 60 may request virtual memory mapping information from the virtual memory manager 64. (step ST5) The request preferably also specifies that if the virtual memory manager is not successful in performing the translation, the virtual memory manager will attempt to page the data of interest in from a disk.

In step ST1a, the virtual memory manager 64 receives the request for virtual memory mapping information from the recoverable I/O request processor 60. The request may include the virtual memory address for which translation was attempted. The virtual memory manager 64 may then determine whether a valid page table entry including the physical memory address corresponding to the virtual memory address received from the recoverable I/O request processor 60 exists in the host page tables. (step ST2a) If a valid page table entry exists, the virtual memory manager 64 may extract the mapping information including physical memory address and forward the mapping information to the recoverable I/O request processor 60 through the I/O device driver 62. (step ST3a) If a valid page table entry corresponding to the virtual memory address does not exist, the virtual memory manager preferably attempts to page the data in from a disk. (step ST4a) If the page-in operation is successful, the virtual memory manager preferably updates the corresponding host page table entry (step ST6a) and communicates the page table entry to the recoverable I/O request processor. (step ST3a) If the page-in operation is not successful, the virtual memory manager may continue attempting to page the data in until a success occurs. If the number of attempts exceeds a predetermined number or a timeout occurs (steps ST4a–ST7a), the virtual memory manager may notify the recoverable I/O request processor of the failure. (step ST8a)

In step ST6, the recoverable I/O request processor 60 determines whether the mapping information has been received from the virtual memory manager. If the mapping information has been received, the I/O request processor may then update its local translation tables (step ST7), perform the translation, and process the I/O request. If the recoverable I/O request processor 60 receives notification that the virtual memory manager was unsuccessful in performing the translation, the recoverable I/O request processor 60 may fail the I/O operation. (step ST8)

Figure 4A:
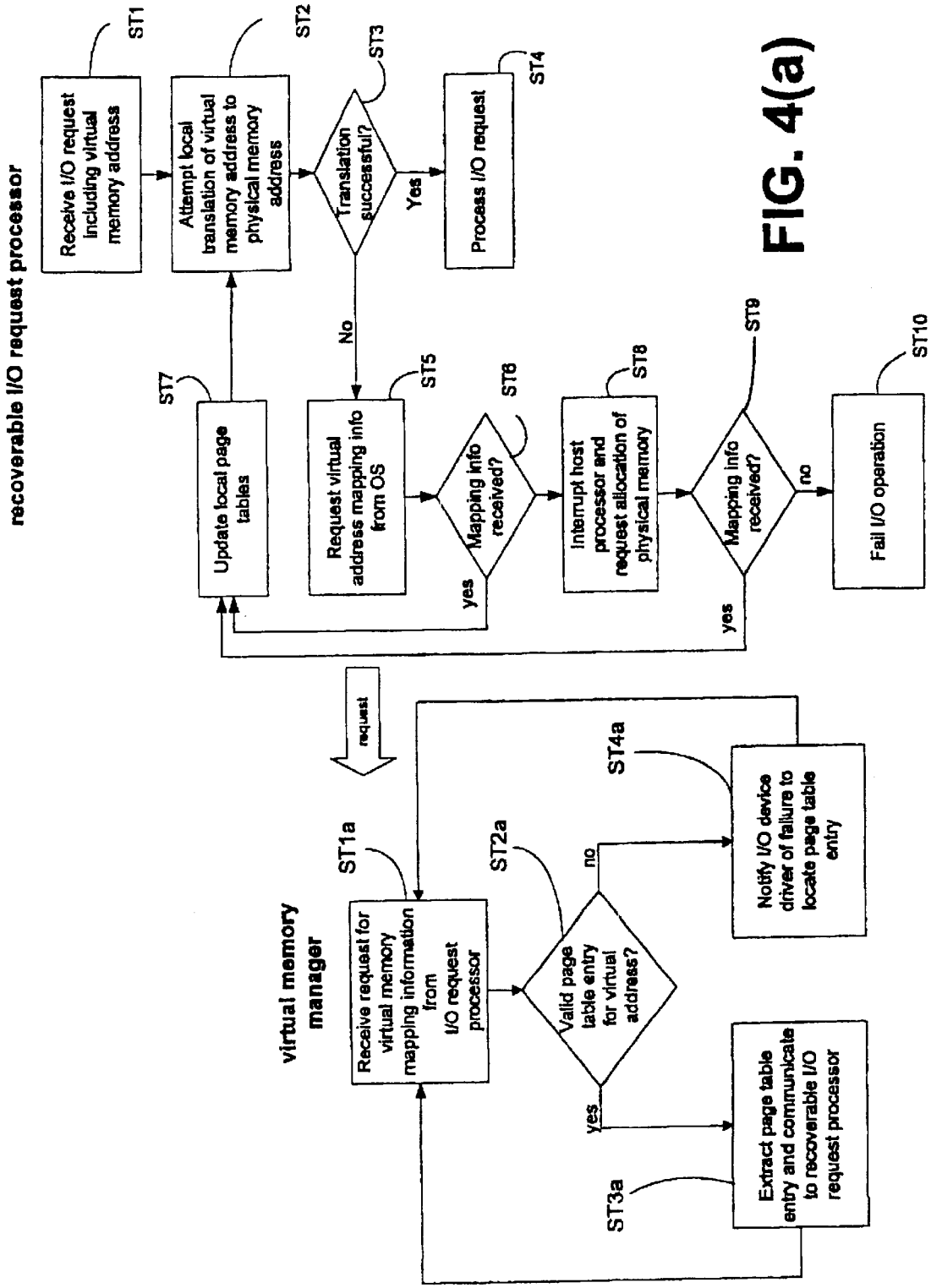
FIG. 4(a) is a flow diagram illustrating exemplary steps that may be performed by a recoverable I/O request processor and a virtual memory manager for processing I/O requests including virtual memory addresses according to another embodiment of the invention.

The present invention is not limited to the steps in FIG. 4 for recovering from local virtual memory address translation failures. For example, FIG. 4(a) illustrates an alternative method for recovering from local address translation failures. In FIG. 4(a), steps ST1–ST4 performed by the recoverable I/O request processor 60 are identical with steps ST1–ST4 in FIG. 4 and need not be further described. In step ST5, when the recoverable I/O request processor is not successful in performing a local virtual memory address translation, the recoverable I/O request processor 60 may request virtual mapping information from the operating system. However, unlike step ST5 in FIG. 4, the request may not include instructions to automatically page data in from a disk. The virtual memory manager receives the request and attempts to translate the virtual memory address by accessing the host page tables (steps ST1a and ST2a). In step ST3a, if the virtual memory manager is successful, the virtual memory manager may communicate the page table entry to the recoverable I/O request processor. (step ST3a) If, however, the virtual memory manager is unsuccessful, the virtual memory manager may notify the recoverable I/O request processor of the failure. (step ST4a) In response to receiving failure notification, the recoverable I/O request processor may generate an interrupt to the host processor requesting allocation of main memory for the virtual address. (step ST8) For example, if the reason for the failure by the virtual memory manager 64 to locate a valid page table entry was that the virtual page containing the virtual address of interest was paged out to a disk, the recoverable I/O request processor 60 preferably requests that the virtual page be moved from the disk to main memory. If the virtual memory manager 64 is successful in moving the page to main memory from the disk, the virtual memory manager 64 preferably updates the host page tables and communicates the updated page table entry to the recoverable I/O request processor. If the virtual memory manager is unable to bring the page in from a disk, the virtual memory manager preferably notifies the I/O request processor of the failure.

In step ST9, the recoverable I/O request processor determines whether the virtual memory manager was successful in moving the page back in from the disk and communicating the virtual address mapping information. If the virtual address mapping information is received, the I/O request processor updates its local page tables, performs the translation, and processes the I/O request. If the I/O request processor receives notification that the virtual memory manager was unable to move the page to main memory from disk in response to the interrupt, the recoverable I/O request processor device may fail the I/O request. (step ST10) Because the I/O device is capable of recovering from local virtual address translation failures, I/O requests can be processed with increased speed without requiring locking or preregistration of virtual memory used in I/O operations.

The present invention is not limited to the processing routines illustrated in FIGS. 4 and 4(a) for recovering from a local virtual memory address translation failure. For example, in an alternative embodiment, rather than requesting virtual memory mapping information from the virtual memory manager, the recoverable I/O request processor of the I/O device may access the host page tables directly, for example, using a direct memory access (DMA) operation, in order to determine the physical memory address corresponding to the virtual memory address. Any method of obtaining virtual memory address information from the host computer memory is within the scope of the invention.

As discussed above, the virtual memory manager 64 and the I/O device driver 62 preferably include routines for maintaining coherence between virtual memory mapping information of the I/O request processor 60 and virtual memory mapping information of the operating system 35. Maintaining coherence may include informing the recoverable I/O request processor 60 when a page of virtual memory utilized by the application program 66 is paged out from main memory to a disk or paged in from a disk to main memory. This notification allows the recoverable I/O request processor to update its local page tables to reflect the pages of a process actually in physical memory. As a result, the number of misses by the I/O request processor is reduced, and I/O operation efficiency is increased. The virtual memory manager 64 may also inform the recoverable I/O request processor 60 of changes in protection attributes of virtual memory pages.

Figure 5:
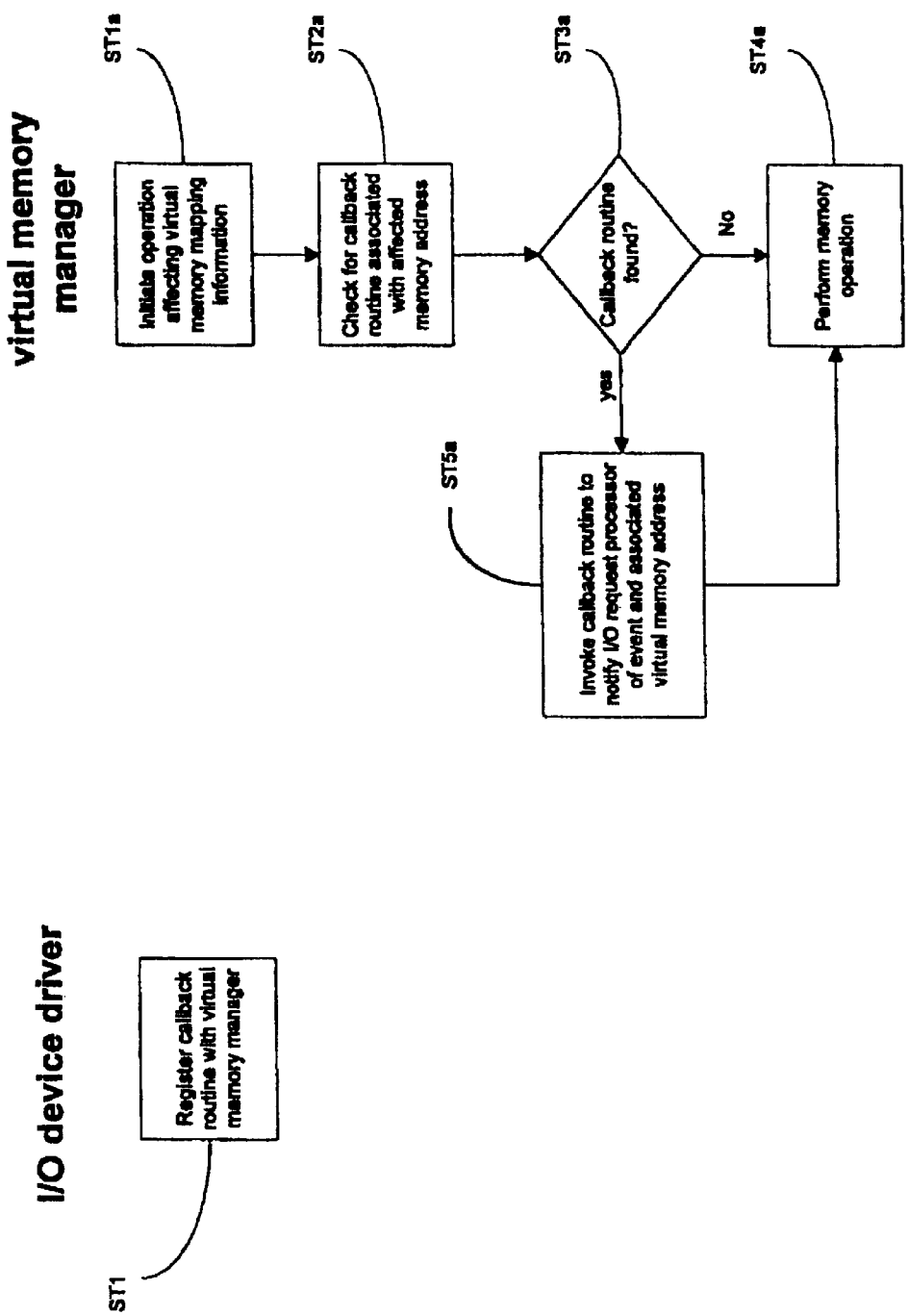
FIG. 5 is a flow diagram illustrating exemplary steps that may be performed by a virtual memory manager of an operating system for performing a page out or a memory protection attribute change operation according to an embodiment of the invention.

Notifying an I/O device of a page out operation may not be a standard interaction between an operating system and I/O device. This nonstandard interaction may be implemented in any number of ways. FIG. 5 illustrates exemplary steps that may be performed by the virtual memory manager and the I/O device driver to inform the recoverable I/O request processor of a page out or other operation affecting virtual memory. For example, in step ST1, the I/O device driver may register a callback routine with the virtual memory manager. The callback routine may be associated with a particular process or virtual address space in a preferred embodiment, or in an alternative embodiment, the callback routine may be invoked for all processes. In yet another alternative arrangement, an extra in-use bit may be included in the host page table entries to indicate pages that are being used by an I/O device. In such an arrangement, the callback routine may only be invoked when a memory operation affects one of the pages, rather than being invoked for all pages belonging to a process using the I/O device.

Once the callback routine is registered with the virtual memory manager, the virtual memory manager may initiate a memory operation, such as a page-out or a change in memory protection attributes. (step ST1a) In steps ST2a and St3a, the virtual memory manager checks for a callback routine associated with the affected memory address. If no callback routine is found, the virtual memory manager may perform the memory operation, i.e., without notifying the recoverable I/O request processor. (step ST4a) If a callback routine is found, the virtual memory manager may invoke the callback routine with the appropriate arguments to notify the I/O request processor. For example, the arguments to the callback routine may comprise the memory operation being performed, the virtual memory address affected, or any other information which may be used by the recoverable I/O request processor to maintain proper memory mapping information.

Figure 5A:
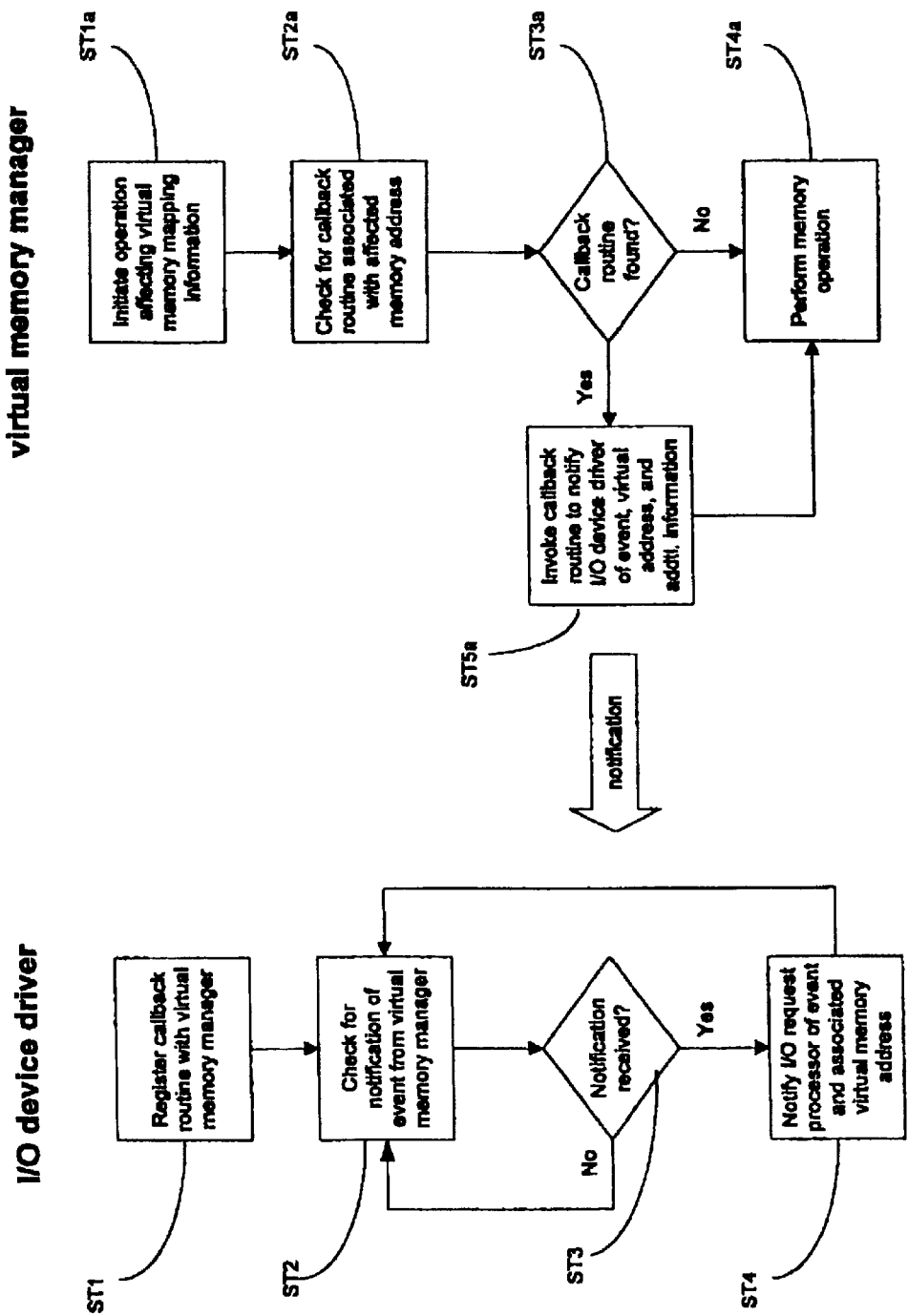
FIG. 5(a) is a flow diagram illustrating exemplary steps that may be performed by a virtual memory manager and an I/O device driver of an operating system in executing a page-out or memory attribute change operation according to another embodiment of the present invention.

The present invention is not limited to the steps in FIG. 5 for notifying the recoverable I/O request processor of changes in memory mapping information. For example, in FIG. 5(a) asynchronous event notification may be used to notify the I/O request processor of changes in virtual memory mapping information. In step ST1, the I/O device driver may register a callback routine with the virtual memory manager. After registering the callback routine, the I/O device preferable checks whether notification of an event affecting a virtual memory address has been received from the virtual memory manager. (step ST3) Checking for notification may be performed in any suitable manner, for example, by polling an event handle associated with the callback routine. If the event is not signaled, the I/O device driver preferably continues the checking.

In step ST1a, the virtual memory manager initiates a memory operation, such as a page out or a change in memory protection attributes. The virtual memory manager preferably determines if there is a callback routine associated with the affected memory region (steps ST2a and ST3a). If there is no callback routine associated with the affected address space, the virtual memory manager may perform the memory operation without notifying the I/O device driver. (step ST4a) If there is a callback routine associated with the affected memory region, the virtual memory manager executes the callback routine and notifies the I/O device driver of the specific event being performed and any additional information associated with the event (steps ST5a). After notifying the I/O device driver, the virtual memory manager may perform the memory operation.

When the I/O device driver receives notification of an event from the virtual memory manager, the I/O device driver notifies the recoverable I/O request processor of the event and the virtual memory address associated with the event. (step ST4) The recoverable I/O request processor updates its local page tables if an entry exists for the virtual memory address. The I/O device driver may then continue checking for more events.

Maintaining coherent information between host page tables and I/O device page tables reduces the need for additional steps in processing I/O requests. For example, if the I/O device is informed that a page has been moved from main memory, the I/O device can proceed to request that the page be moved back to main memory without first requesting a translation from the virtual memory manager. Moreover, the need for locking pages in main memory is reduced according to embodiments of the present invention.

As stated above, the I/O processing methods and systems may be used with a variety of I/O devices to enhance I/O performance. One particular I/O device whose performance may be improved by the recoverable I/O processing methods and systems according to the present invention is a Virtual Interface Architecture (VIA) network interface adapter. VIA network interface adapters may be used in high-speed network applications, such as system area networks, to increase the speed of memory transfers between connected machines. In order to improve I/O performance, VIA network interface adapters are capable of performing local virtual memory address translations. However, conventional VIA network interface adapters are incapable of recovering from local translation failures. The behavior of a conventional VIA network interface adapter typically is a fatal error if such a condition occurs, which may include breaking connection with a remote host. The present embodiment enhances the I/O performance of VIA network interface adapters by enabling the VIA network interface adapter to recover from local translation failures.

Figure 6:
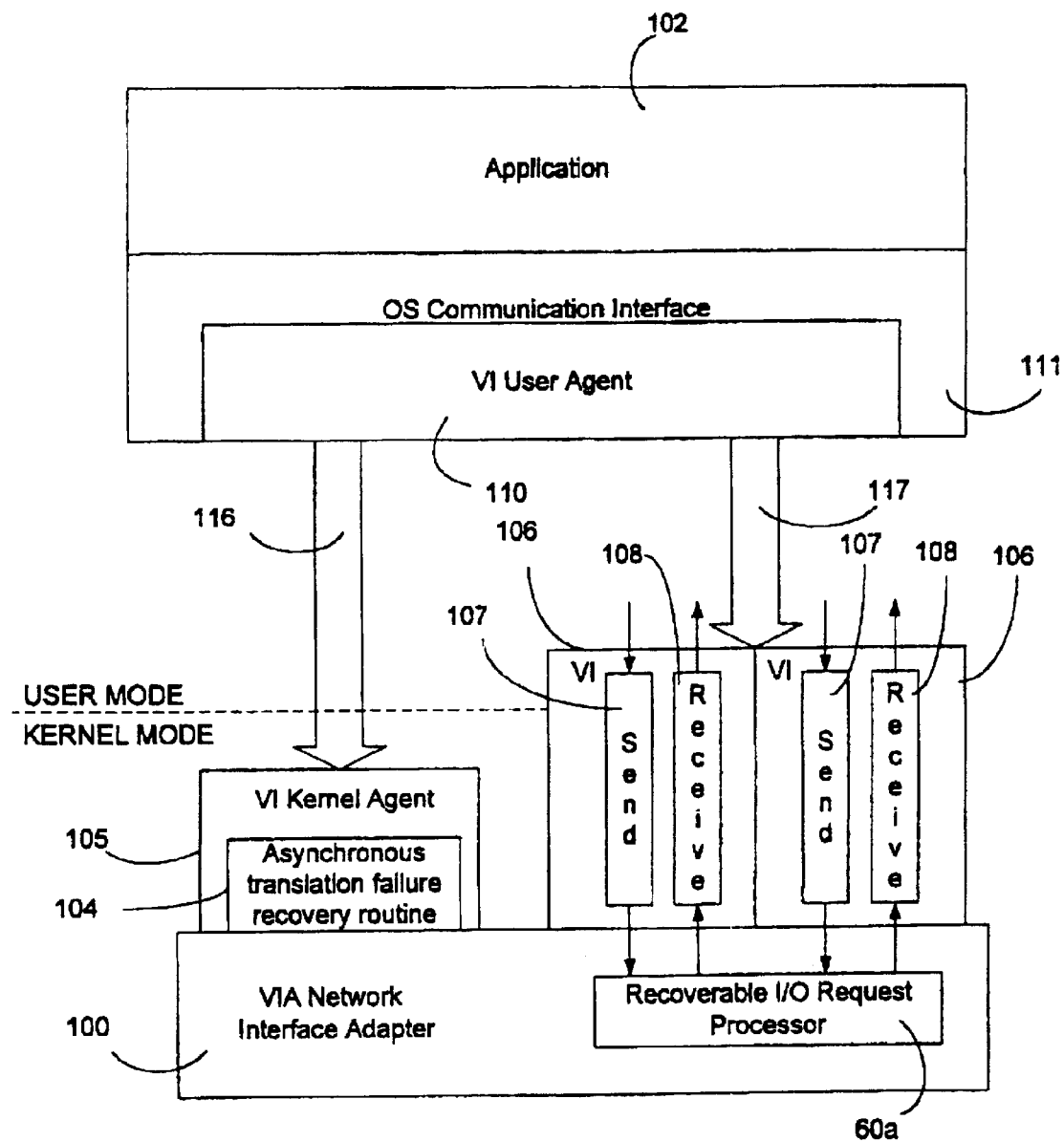
FIG. 6 is a block diagram illustrating an exemplary Virtual Interface Architecture model including a recoverable I/O request processor according to an embodiment of the invention.
Figure 6A:
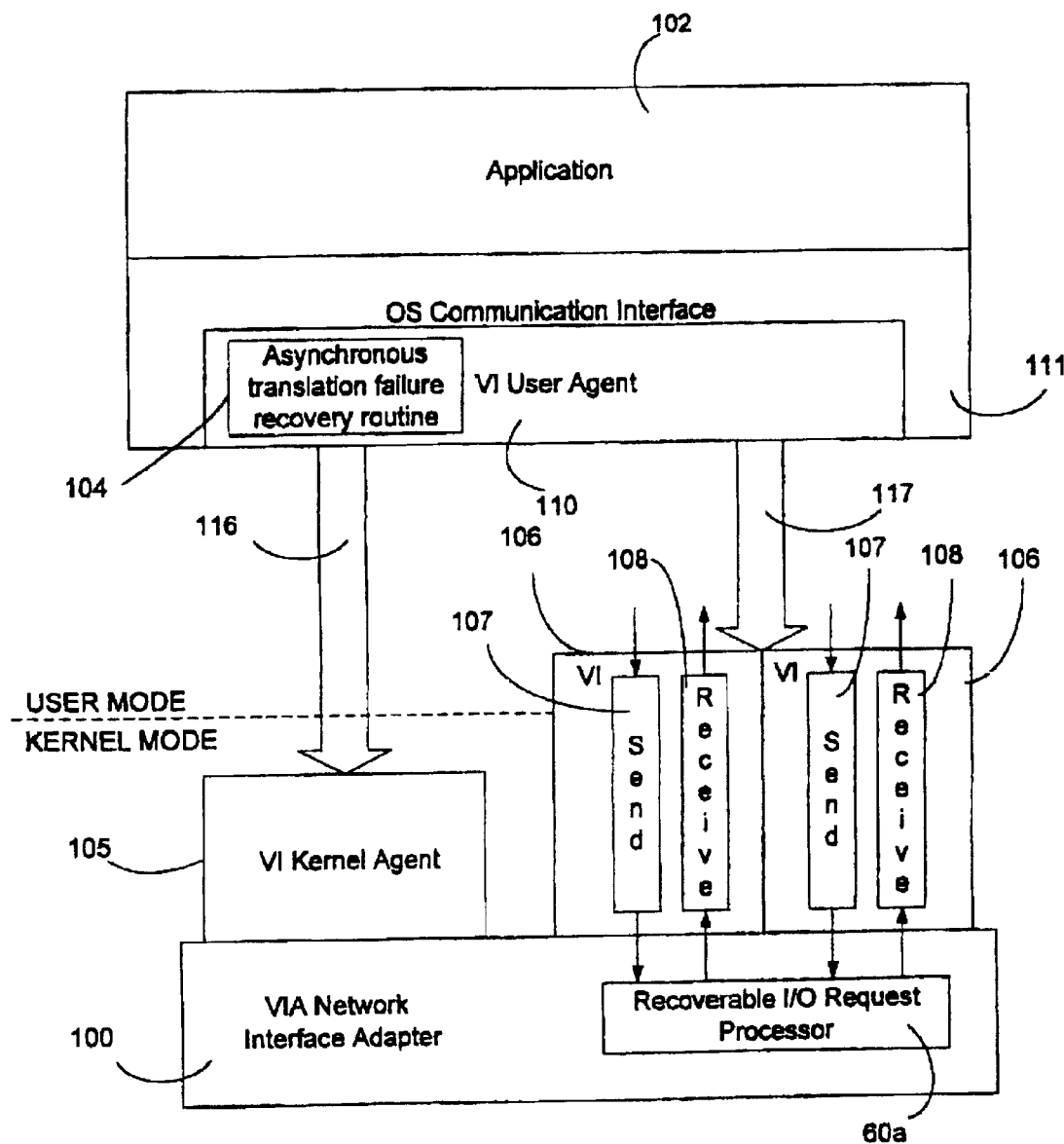
FIG. 6(a) is a block diagram illustrating an exemplary Virtual Interface Architecture model including a recoverable I/O request processor according to an alternative embodiment of the invention.

FIG. 6 is an architectural block diagram of hardware and software components of the Virtual Interface Architecture system including a VIA network interface adapter 100 capable of recovering from virtual address translation failures. In the illustrated system, the VIA network interface adapter 100 comprises an I/O device capable of sending and receiving requests over a network. The VIA network interface adapter 100 may comprise any type of network adapter capable of high-speed communications, for example, an Ethernet card, such as a gigabit Ethernet card.

According to an important aspect of the invention, the VIA network interface adapter 100 includes a recoverable I/O request processor 60a for translating virtual memory addresses to physical memory addresses, maintaining local page tables, and recovering from local address translation failures. The recoverable I/O request processor 60*a* may recover from local address translation failures in any manner previously described, for example, by requesting virtual address mapping information from the virtual memory manager of the operating system (not shown in FIG. 6). In the illustrated embodiment, the recoverable I/O request processor 60*a* interacts with an asynchronous translation failure recovery routine 104 associated with a VI kernel agent 105 to resolve virtual memory addresses when the recoverable I/O request processor initially fails to translate a virtual memory address. The asynchronous failure recovery routine may be called by the VI kernel agent 105 to monitor address translation failures and recover from the address translation failures. In an alternative arrangement, for example, as illustrated in FIG. 6(*a*), the asynchronous translation failure recovery routine 104 may be associated with and called by a VI user agent 110. The interaction between the recoverable I/O request processor 60*a* and the asynchronous translation failure recovery routine 104 will be described in more detail below.

The VI kernel agent 105 is the device driver for the VIA network interface adapter 100. The VI kernel agent 105 is preferably a component of the operating system executing on the host machine in kernel mode. The VI kernel agent 105 may receive memory registration requests originating from the application program 102. However, because the recoverable I/O request processor 60*a* and the asynchronous translation failure recovery routine cooperate to resolve address translation failures, memory registration by the application prior to executing I/O requests may not be required. In addition to receiving memory registration requests, the VI kernel agent 105 may establish and break connection with remote machines. The VI kernel agent 105 may also manage one or more virtual interfaces, such as VIs 106, to provide communication interfaces between a process, such as the application 102, and the VIA network interface adapter 100.

Each virtual interface 106 may comprise a send queue 107 and a receive queue 108. In order to request an I/O operation, the VI user agent I/O posts descriptors to the send and receive queues. A descriptor is a data structure specifying information to assist the recoverable I/O request processor 60*a* of the VIA network interface adapter 100 to process an I/O request. For example, if the I/O operation request is a "Winsock" send0 operation, the descriptor may include a virtual memory address of the buffer to be sent. If the I/O request operation is a "Winsock" recv0 operation, the descriptor may include the virtual address of the buffer where data received from a remote location are to be stored. The descriptor may also include control codes indicating the type of operation being performed and memory handles used by the recoverable I/O request processor 60*a* to qualify the virtual address to the recoverable I/O request processor.

In order to allow applications to communicate with the VI kernel agent and the virtual interface 106 using standard I/O functions, the illustrated architecture includes the VI user agent 110 and an operating system communication interface 111. The operating system communication interface may comprise any standard communications library or libraries for performing network I/O, e.g., sockets, MPI, cluster, or other communications library. The VI user agent 110 comprises an interface for abstracting details of the underlying communications hardware to the application 102.

According to an important aspect of the invention, the recoverable I/O request processor 60*a* preferably notifies the application 102 of a failed virtual address translation through the VI kernel agent 105. Alternatively, when the asynchronous translation error recovery routine 104 resides in the VI user agent 110, the VI user agent 110 may notify the application 102. The asynchronous translation error recovery routine 104 may assist the recoverable I/O request processor 60*a* in translating the virtual memory address. For example, if a virtual address translation failed because the data in an I/O operation was paged out to a disk, the asynchronous error recovery routine may request that the data be paged back into and locked in main memory. The asynchronous error recovery routine may also register the virtual memory address with the VI kernel agent 105. The VI kernel agent 105 may then communicate the virtual memory address to the recoverable I/O request processor to allow the recoverable I/O request processor to perform an address translation that previously failed.

The application 102 may comprise any user mode network communications application, e.g., a web browser. The application preferably calls the asynchronous translation error recovery routine 102 when the recoverable I/O request processor fails to translate a virtual memory address. The application 102 may also perform other functions, such as requesting initialization of virtual interfaces, establishing connection with remote machines over a network, and breaking connection with remote machines. However, because I/O request processing is recoverable according to the present embodiment, the application is preferably not required to call memory registration routines prior to initially sending or receiving data.

Figure 7:
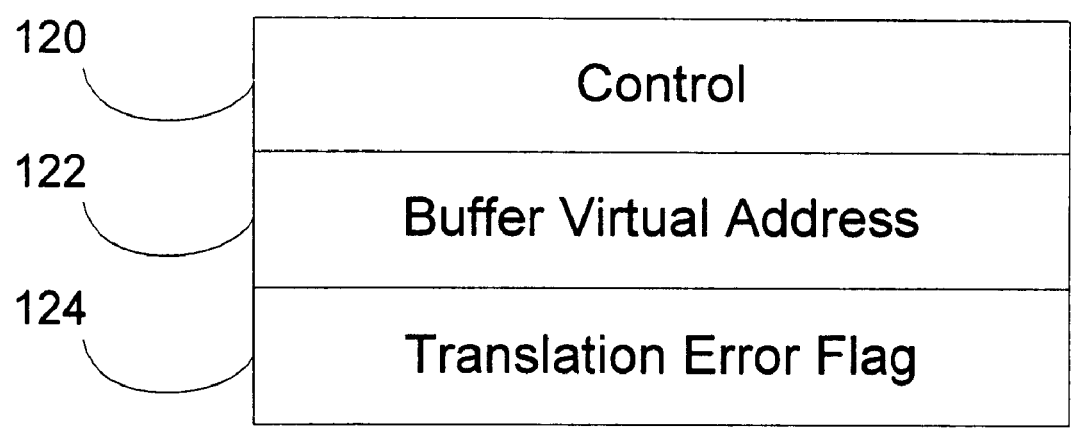
FIG. 7 is a block diagram illustrating exemplary fields of an I/O request descriptor data structure according to an embodiment of the invention.

In order to request the performance of an I/O operation, the application 102 may utilize any standard network communication function, such as a Winsock send( ) function. When the application executes a send( ) function, the VI user agent I/O posts a descriptor in the send queue 107. FIG. 7 illustrates some of the fields that may be included in the descriptor. The descriptor preferably includes a control field 120 indicating the operation to be performed, e.g., send or receive, a virtual memory address field 122 indicating the virtual memory address of the buffer to be sent, and a buffer length field 124 indicating the length of the buffer, e.g., in bytes. In accordance with an important aspect of the invention, the descriptor preferably also includes an address translation error control flag field 126. The address translation error control flag field 126 may contain an address error control flag. The address translation error control flag 126 is used by the VI user agent to indicate the action to be taken by the recoverable I/O request processor when the recoverable I/O request processor fails to locally translate a virtual memory address. For example, the translation error control flag may have a first state that instructs the recoverable I/O request processor to fail an I/O operation when a address translation error occurs. However, the translation error control flag preferably also has a second state for instructing the recoverable I/O request processor to take corrective action when an address translation error occurs. For example, the recoverable I/O request processor may suspend processing of an I/O operation when a translation failure occurs, notify the application of the failure, and resume processing of the I/O operation after corrective action has been performed.

Figure 8:
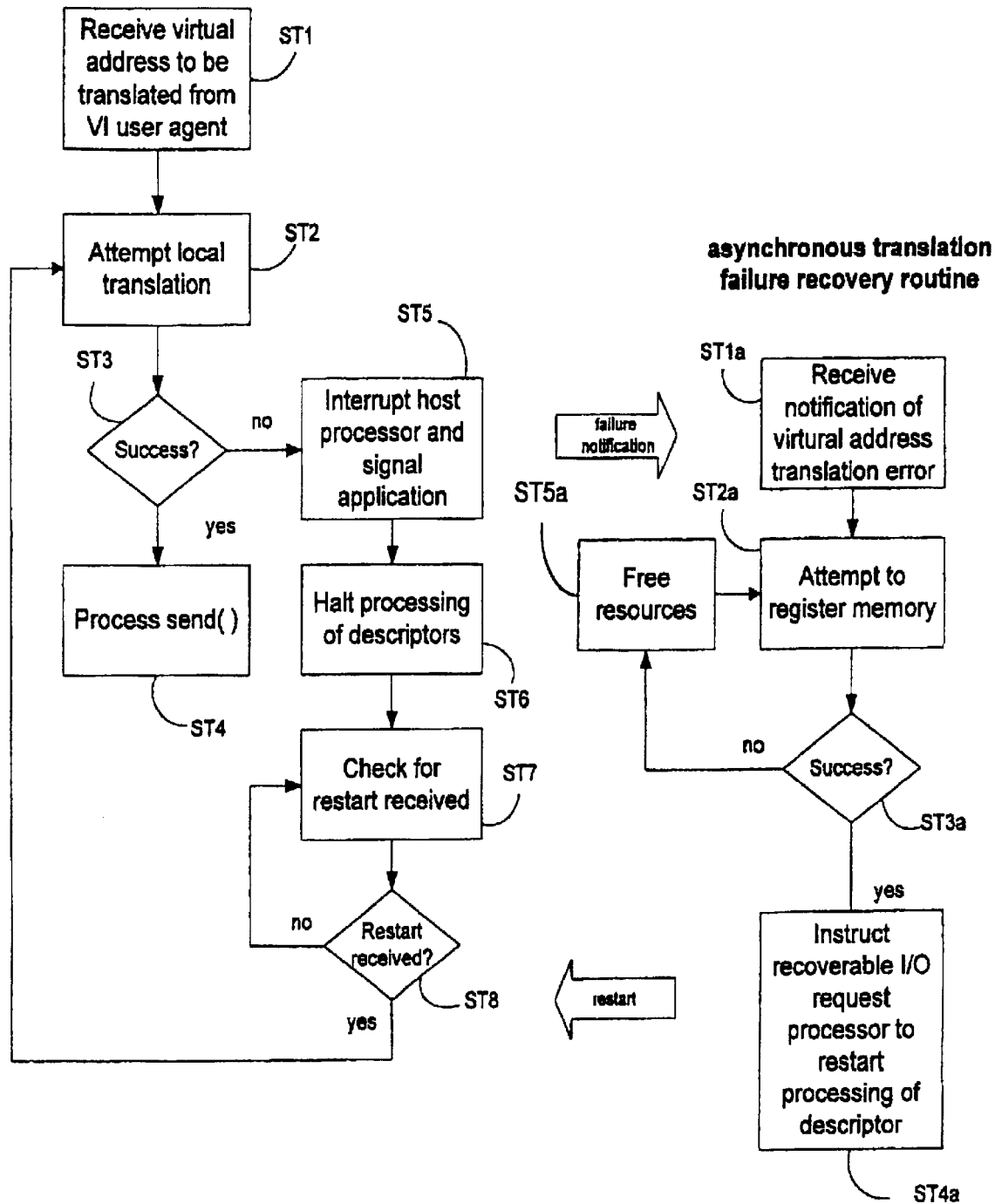
FIG. 8 is a flow chart illustrating steps that may be performed by a recoverable I/O request processor and the asynchronous translation failure recovery routine 104 of FIGS. 6 and 6(a).

FIG. 8 illustrates the steps which may be performed by the asynchronous translation failure recovery routine and the recoverable I/O request processor 60*a* in response to a Winsock send0 operation executed by the application program. When the application executes a send0 operation, the VI user agent posts a descriptor to the send0 queue of a virtual interface and rings the corresponding doorbell. The descriptor may include the virtual memory address of the buffer to be sent and the translation error control flag. For purposes of this example, it is assumed that the translation error control flag is set to the second state for instructing the recoverable I/O request processor to attempt to recover from descriptor virtual address translation failures. In order to post a descriptor to a send queue, the VI user agent may transmit a pointer to the descriptor specified by a virtual memory address to the send queue. In order to access the contents of the pointer, the recoverable I/O request processor first translates the virtual memory address of the pointer to the descriptor. Because the translation of the descriptor virtual address may fail, the present invention preferably also includes a mechanism for instructing the recoverable I/O request processor to take corrective action when it is incapable of translating the virtual memory address of a descriptor.

Instructing the recoverable I/O request processor to take corrective action in response to descriptor virtual address translation failures may occur in any number of ways. For example, a descriptor translation control flag may be included in the routine called by the VI user agent to post the descriptor in the send queue. In another alternative, the VI kernel agent may specify that a particular virtual interface will attempt to recover from descriptor address translation errors when the virtual interface is created. In yet another alternative, the VI user agent may communicate a special descriptor memory handle to the recoverable I/O request processor to instruct it to attempt to recover from descriptor address translation failures. In this example, it is assumed that the recoverable I/O request processor has been instructed to attempt to recover from descriptor address translation failures.

Referring to FIG. 8, in step ST1, the recoverable I/O request processor receives a pointer to the descriptor corresponding to the send( ) operation The pointer may have been previously posted in the send queue by the VI user agent. In step ST2, the recoverable I/O request processor attempts to translate the virtual memory address of the descriptor using page tables local to the VIA network interface adapter. The recoverable I/O request processor 60a then determines whether the translation was successful. (step ST3) If the translation was successful, the recoverable I/O request processor processes the send0 request. (step ST4) Processing the send request may include retrieving the contents of the descriptor from the physical memory address, translating the physical address of the buffer, and sending the buffer to a remote VIA network adapter connected to the VIA network interface adapter 100 over a network. The steps for translating the virtual memory address of the send buffer are similar to the steps illustrated in FIG. 8 for translating the virtual memory address of the descriptor and need not be further described.

In step ST5, if the recoverable I/O request processor determines that it is unable to translate the virtual memory address of the descriptor to a physical memory address, the recoverable I/O request processor generates an interrupt to the host processor. The VI kernel agent receives the interrupt and invokes the translation failure routine upon receiving failure notification from the recoverable I/O request processor. In an alternative arrangement, where the asynchronous translation failure recovery routine resides in the VI user agent, the VI user agent may post an asynchronous call to the virtual address translation error recovery routine, with the virtual memory address and the descriptor as arguments.

In step ST1a, the virtual address translation failure recovery routine receives notification of the virtual address translation error. In step ST2a, the asynchronous translation failure recovery routine attempts to register the virtual memory address of the descriptor. Memory registration may include transmitting a memory registration request to the VI kernel agent. The VI kernel agent translates the virtual memory address of the descriptor to a physical memory address utilizing the host page table and communicates the physical memory address to the recoverable I/O request processor. Registration may also include locking the page containing the descriptor in main memory. The translation failure recovery routine may determine if the registration is successful. (step ST3a) If the registration is successful, the translation failure recovery routine may instruct the send queue to restart processing of the send( ) operation. (step ST4a) If the registration is not successful, e.g., because the application has reached a limit set the by the operating system on the amount of memory that can be locked, the asynchronous translation failure recovery routine may request that the VI kernel agent de-register some of the pages that are not being used (step ST5a) and re-attempt the memory registration. Because the recoverable I/O request processor receives virtual address mapping information when local translation initially fails, the recoverable I/O request processor may be able to translate the virtual memory address to the physical memory address and continue processing the send( ) operation.

The present invention is not limited to the embodiments in FIGS. 6–8 for processing I/O requests communicated to a VIA network interface adapter. For example, the asynchronous translation failure recover routine 104 in FIG. 6 may be omitted, and the virtual memory manager and the I/O device driver of FIG. 2 may notify the recoverable I/O request processor of memory operations performed by the virtual memory manager. If such notification is included in a system for communicating with a VIA network interface adapter, the need for registration and locking of memory may be eliminated or at least reduced.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A descriptor for communicating an I/O request to an I/O device, the descriptor comprising:

a control field for storing a code indicative of an I/O operation;

a buffer virtual address field for storing a virtual memory address of a buffer to be utilized in an I/O operation; and a mechanism for instructing a recoverable I/O request processor of an I/O device to attempt to recover from a virtual address translation failure.

2. The descriptor of claim 1 wherein mechanism comprises a translation error control flag field including a translation error control flag having a first value for instructing the recoverable I/O request processor to attempt to recover from virtual address translation failures.

3. The descriptor of claim 2 wherein the translation error control flag has a second value for instructing the recoverable I/O request processor not to recover from virtual address translation failures.

4. The descriptor of claim 3 wherein the mechanism comprises a handle communicated to the recoverable I/O request processor, the handle having a first value for instructing the recoverable I/O request processor to attempt to recover from virtual address translation failures.

5. The descriptor of claim 4 wherein the handle has a second value for instructing the recoverable I/O request processor not to recover from virtual address translation failures.

6. A system for processing input/output requests for sending and receiving data over a network comprising:
- an I/O request queue for receiving descriptors specifying I/O requests from application programs; and
- a recoverable I/O request processor for processing the descriptors, including translating the virtual memory addresses of the descriptors to physical memory addresses, suspending processing of the descriptors in the I/O request queue when an address translation failure occurs, and resuming processing of the descriptors when the address translation failure is corrected.

7. The system of claim 6 comprising a device driver for registering and deregistering memory with the I/O request processor in response to memory registration requests from an application program.

8. The system of claim 6 comprising an asynchronous virtual address translation failure recovery routine for requesting registration of memory used by the application when the recoverable I/O request processor fails to translate a virtual memory address to a physical memory address.

9. The system of claim 8 wherein the asynchronous virtual address translation failure recovery routine resides in and is called by a device driver associate with an I/O device for processing the I/O requests.

10. The system of claim 8 comprising a user agent for receiving I/O requests from an application and, in response, posting the descriptors the I/O request queue, wherein the asynchronous translation failure recovery routine is located in the user agent.

* * * * *